United States Patent
Kim et al.

(10) Patent No.: US 9,464,911 B2
(45) Date of Patent: Oct. 11, 2016

(54) VEHICLE AND METHOD OF CONTROLLING THE SAME

(71) Applicant: HYUNDAI MOTOR COMPANY, Seoul (KR)

(72) Inventors: Yeon Ji Kim, Seoul (KR); Hyun Seung Yang, Seongnam-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/536,236

(22) Filed: Nov. 7, 2014

(65) Prior Publication Data

US 2015/0134248 A1    May 14, 2015

(30) Foreign Application Priority Data

Nov. 8, 2013    (KR) .................. 10-2013-0135530

(51) Int. Cl.
*G01C 21/36*    (2006.01)

(52) U.S. Cl.
CPC ................. *G01C 21/3617* (2013.01)

(58) Field of Classification Search
CPC .. G01C 21/3605; G01C 21/36; G01C 21/26; G01C 21/3611; G01C 21/3632; G01C 21/20
USPC ................. 701/400, 532, 533, 538
See application file for complete search history.

(56) References Cited

U.S. PATENT DOCUMENTS

| | | | |
|---|---|---|---|
| 7,076,505 B2 * | 7/2006 | Campbell | G01C 21/367 340/990 |
| 8,259,231 B2 * | 9/2012 | Tsai | G01C 21/26 348/156 |
| 9,140,570 B1 * | 9/2015 | Baird | G01C 21/3446 |
| 2010/0186025 A1 * | 7/2010 | Thomas | G06F 3/0481 725/5 |
| 2010/0222078 A1 * | 9/2010 | Tysowski | G01C 21/3682 455/456.3 |
| 2011/0010085 A1 * | 1/2011 | Tanaka | G01C 21/3461 701/533 |

(Continued)

FOREIGN PATENT DOCUMENTS

| | | | |
|---|---|---|---|
| JP | 2005283272 A | 10/2005 | |
| JP | 2007-192697 A | 8/2007 | |

(Continued)

OTHER PUBLICATIONS

Office Action issued in corresponding Korean Patent Application No. 10-2013-01135530, mailed on Dec. 16, 2014; 14 pages with English translation.

(Continued)

*Primary Examiner* — Shardul Patel
(74) *Attorney, Agent, or Firm* — McDermott Will & Emery LLP

(57) ABSTRACT

A vehicle is provided in which, when an estimated driving time for a destination set by a user exceeds a predetermined time, a stop at which the user can take a break when the predetermined time elapses after driving starts is searched for, and information on the stop is provided so that the user may be prompted to take a break during long-term driving. The vehicle includes an input unit for receiving information on destination setting from a user, a controller for generating a driving path from a departure position to the set destination and search for a stop candidate that is located on the driving path or a location adjacent to the driving path when an estimated driving time for the driving path is a predetermined first reference time or more, and a display unit configured to display a guide popup related to the searched stop candidate.

20 Claims, 18 Drawing Sheets

(56) References Cited

U.S. PATENT DOCUMENTS

| | | | |
|---|---|---|---|
| 2011/0022313 A1* | 1/2011 | Bugnariu | G01C 21/343 701/469 |
| 2011/0060495 A1* | 3/2011 | Kono | B60W 40/072 701/31.4 |
| 2011/0106446 A1* | 5/2011 | Waeller | B60K 35/00 701/533 |
| 2011/0153186 A1* | 6/2011 | Jakobson | G01C 21/20 701/532 |
| 2012/0133515 A1* | 5/2012 | Palshof | B60W 50/14 340/575 |
| 2013/0006904 A1* | 1/2013 | Horvitz | G06Q 10/10 706/46 |
| 2013/0253833 A1* | 9/2013 | Tuukkanen | G01C 21/26 701/538 |

FOREIGN PATENT DOCUMENTS

| | | |
|---|---|---|
| JP | 2007-333433 A | 12/2007 |
| JP | 2008032558 A | 2/2008 |
| JP | 2010146360 A | 7/2010 |
| JP | 2011-052979 A | 3/2011 |
| JP | 2011052979 A | 3/2011 |
| JP | 2013-011524 A | 1/2013 |

OTHER PUBLICATIONS

Office Action issued in corresponding Korean Patent Application No. 10-2013-01135530, mailed on Jun. 11, 2015; 4 pages with English translation.

* cited by examiner

VEHICLE AND METHOD OF CONTROLLING THE SAME

CROSS-REFERENCE TO RELATED APPLICATION

This application claims the benefit of Korean Patent Application No. P2013-0135530, filed on Nov. 8, 2013 in the Korean Intellectual Property Office, the disclosure of which is incorporated herein by reference.

TECHNICAL FIELD

The present invention relates to a vehicle that prompts a driver to take a break to prevent long-term driving and a method of controlling the same.

BACKGROUND

When a driver drives for a long time, the driver's concentration may decrease and the driver is likely to be drowsy while driving. According to a research result, an accident rate due to drowsy driving in long-term driving is 3 times higher than that of drunk driving, and a mortality of accidents due to drowsy driving is 4.5 times higher than that of general accidents, and 2.5 times higher than that of drink-driving.

Long-term driving without the driver taking a break acts as an important factor interfering with safe driving. For this reason, some countries impose fines when vehicles are driven for a specific time or more.

Accordingly, development of technology for effectively preventing driver's from performing long-term driving is necessary.

SUMMARY

A vehicle is provided in which, when an estimated driving time for a destination set by a user exceeds a predetermined time, a stop at which the user can take a break when the predetermined time elapses after driving starts is searched for, and information on the stop is provided to the user so that he or she may be prompted to take a break during long-term driving, and a method of controlling the same.

According to an aspect of the present invention, A vehicle includes an input unit configured to receive information on destination setting from a user, a controller configured to generate a driving path from a departure position to the set destination and search for at least one stop candidate that is located on the driving path or a location adjacent to the driving path when an estimated driving time for the driving path is a predetermined first reference time or more, and a display unit configured to display a guide popup related to the searched stop candidate.

The controller is configured to search for the stop candidate within a predetermined reference radius based on a location in which the vehicle will be stopped/positioned after a predetermined second reference time elapses from a departure time.

The controller is configured to search for the stop candidate by reflecting the user's destination setting history or the user's preference based on stop setting history.

The vehicle is configured to further include a traffic information receiving unit configured to receive traffic information, wherein the controller may reflect the received traffic information, generate the driving path, and calculate the estimated driving time.

The guide popup is configured to include a button for the user to select a stop.

The button for selecting the stop is configured to include at least one of a button for selecting the searched stop candidate, a button for selecting not to stop, and a button for selecting another stop candidate instead of the searched stop candidate.

When there is a plurality of searched stop candidates, the guide popup may include a button for selecting at least one of the plurality of stop candidates.

The controller is configured to set a stop candidate selected by the user as the stop and guide the vehicle to pass the set stop.

When a new driving path is generated while the vehicle drives, the controller is configured to search for at least one stop candidate that is located on the new driving path or a location adjacent to the new driving path.

When the user selects another stop candidate, the display unit may display a guide popup including a list of other stop candidates.

When the user selects another stop candidate, the display unit may display a map of an area including a location in which the vehicle will be positioned after the second reference time elapses from the departure time, and a position of another stop candidate on the map.

The input unit may receive selection of another stop candidate from the user.

When the user selects not to stop, the display unit may display a guide popup for taking a break after the second reference time elapses from the departure time.

The guide popup may include a message indicating that the second reference time has elapsed from the departure time.

The display unit may display a timer indicating a driving time in a part of a path guide screen for guiding the driving path.

The stop candidate may include a location in which the user can take a break while driving.

According to another aspect of the present invention, a method of controlling a vehicle is provided. The method includes receiving information about destination setting from a user, generating a driving path from a departure position to the set destination, searching for at least one stop candidate that is located on the driving path or a location adjacent to the driving path when an estimated driving time for the driving path is a predetermined first reference time or more, and displaying a guide popup related to the searched stop candidate.

The searching for the at least one stop candidate may include searching for the stop candidate within a predetermined reference radius based on a location in which the vehicle will be positioned after a predetermined second reference time elapses from a departure time.

The searching for the at least one stop candidate may include searching for the stop candidate by reflecting the user's destination setting history or the user's preference based on stop setting history.

The method may further include receiving traffic information, wherein the searching for the at least one stop candidate may include reflecting the received traffic information, generating the driving path, and calculating the estimated driving time.

The guide popup may include a button for the user to select the searched stop candidate.

The button for selecting the stop may include at least one of a button for selecting the searched stop candidate, a button for selecting not to stop, and a button for selecting another stop candidate instead of the searched stop candidate.

When there is a plurality of searched stop candidates, the button for selecting the stop may include a button for selecting at least one of the plurality of stop candidates.

When the stop candidate selected by the user is set as the stop and the second reference time elapses from the departure time, the vehicle may be guided to the set stop.

The method may further include searching for at least one stop candidate that is located on the new driving path or a location adjacent to the new path when the new driving path is generated while the vehicle drives.

The method may further include displaying a guide popup including a list of other stop candidates when the user selects another stop candidate.

The method may further include displaying a map of an area including a location in which the vehicle will be positioned after the second reference time elapses from the departure time, and a position of another stop candidate on the map when the user selects another stop candidate.

The method may further include the user selecting another stop candidate.

The method may further include displaying a guide popup for taking a break after the second reference time elapses from the departure time when the user selects not to stop.

The guide popup may include a message indicating that the second reference time has elapsed from the departure time.

The method may further include displaying a timer indicating a driving time in a part of a path guide screen for guiding the generated driving path.

The method may further include setting the stop candidate set by the user as the stop, generating a new driving path in which the vehicles reaches the destination via the set stop when the set stop is not positioned in the driving path, and guiding the vehicle to the new driving path.

BRIEF DESCRIPTION OF THE DRAWINGS

These and/or other aspects of the invention will become apparent and more readily appreciated from the following description of the embodiment, taken in conjunction with the accompanying drawings of which.

DETAILED DESCRIPTION

Hereinafter, a vehicle and a method of controlling the same according to embodiment of the present invention will be described in detail with reference to the accompanying drawings.

Figure 1:
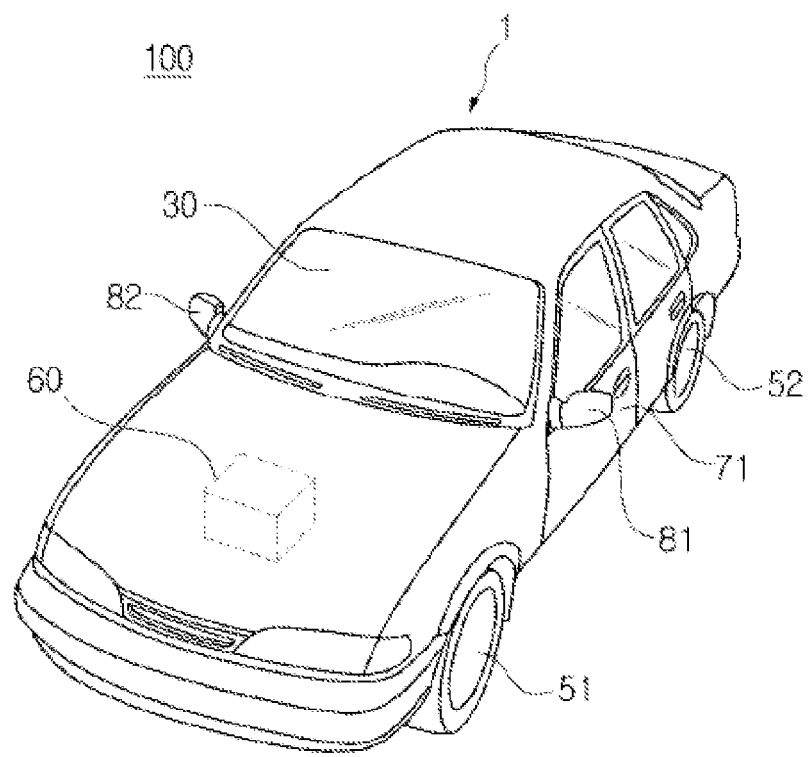
FIG. 1 is a diagram illustrating an appearance of a vehicle according to an embodiment of the present invention.

FIG. 1 is a diagram illustrating an appearance of a vehicle according to an embodiment of the present invention.

As illustrated in FIG. 1, a vehicle 100 according to an embodiment of the present invention includes a main body 1 forming an appearance of the vehicle 100, wheels 51 and 52 moving the vehicle 100, a driving unit 60 rotating the wheels 51 and 52, doors 71 and 72 (refer to FIG. 4) shielding an inside of the vehicle 100 from the outside, a front glass 30 providing a field of view in front of the vehicle 100 to a driver in the vehicle 100, and side mirrors 81 and 82 providing a field of view areas behind and on the sides of the vehicle 100 to the driver.

The wheels 51 and 52 include the front wheels 51 provided in the front of the vehicle and the rear wheels 52 in the rear of the vehicle. The driving unit 60 provides rotary power to the front wheels 51 enabling the main body 1 to move forward or backward. Alternatively, the driving unit 60 provides rotary power to the rear wheels 52. The driving unit 60 may include an engine configured to combust fossil fuels and generate rotary power or a motor configured to receive power from a condenser (not illustrated) and generate rotary power.

The doors 71 and 72 are pivotally provided on left and right sides of the main body 1. When the doors are opened, the driver may enter the vehicle 100. When the doors are closed, the doors shield the inside of the vehicle 100 from the outside.

The front glass 30 is provided in the upper front of the main body 1 and enables the driver in the vehicle 100 to obtain visual information from in front of the vehicle 100, and is also called a windshield glass.

Also, the side mirrors 81 and 82 include the left side mirror 81 provided on the left side of the main body 1 and the right side mirror 82 provided on the right side thereof. These allow the driver in the vehicle 100 to obtain visual information from beside and behind the vehicle 100.

The vehicle 100 may further include a detecting device such as a proximity sensor configured to detect a rear obstacle or other vehicles, and a rain sensor configured to detect rainfall and precipitation.

Figure 2:
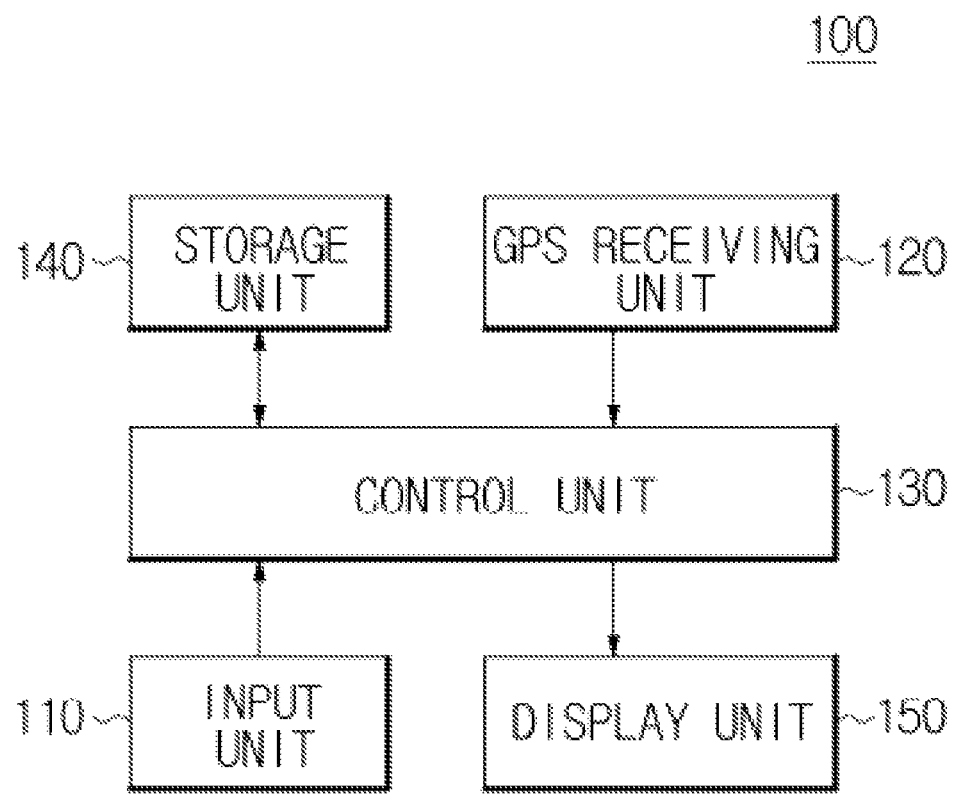
FIG. 2 is a control block diagram of the vehicle according to the embodiment of the present invention.

For example, the proximity sensor transmits a detection signal to a side or a rear of the vehicle and receives a reflection signal reflected from an obstacle such as another vehicle. In addition, the obstacle at the rear of the vehicle 100 may be detected and a location of the obstacle may be detected based on a waveform of the received reflection signal. Such a proximity sensor is configured to use a method in which an ultrasound is transmitted and a distance to the obstacle is detected using an ultrasound reflected from the obstacle. FIG. 2 is a control block diagram of the vehicle according to the embodiment of the present invention.

As illustrated in FIG. 2, the vehicle 100 includes an input unit 110 configured to receive information on destination setting from a user, a Global Positioning System (GPS) receiving unit 120 configured to receive position information of the vehicle 100 from GPS satellites, a controller 130 configured to search for at least one stop candidate that is located on a driving path from a departure position to a destination or a location adjacent to the driving path when an estimated driving time from the departure position to the destination is a predetermined first reference time or more, a storage unit 140 configured to store map data, and a display unit 150 configured to display a guide popup related to the searched stop candidate.

The controller 130 generates a driving path from the departure position to the destination using the map data stored in the storage unit 140, and stores the generated driving path in the storage unit 140. The departure position may be a current position of the vehicle 100 received from the GPS receiving unit 120 or a position that is separately set by a user. The controller 130 calculates an estimated driving time for the driving path, and compares the estimated driving time with the predetermined first reference time. The first reference time is a time serving as a reference used to determine when the driver's continuous driving interferes with safe driving, and may be set by a designer, or set or changed by the user. In addition, when a regulation on long-term driving is set, it is possible to set the first reference time by following the regulation. Hereinafter, in the following embodiment, the first reference time is set to 4 hours.

When the estimated driving time is the first reference time or more, the controller 130 searches for a stop candidate at which to take a break along the way. The stop candidate may be positioned on the driving path or a location adjacent to the driving path. The stop candidate may include any place in which the user stops or parks the vehicle and takes a break, for example, a rest area, a parking lot, a restaurant, a café, a gas station, a park, and a mart.

Specifically, the controller 130 may search for the stop candidate based on a location in which the vehicle is expected to be positioned after a predetermined second reference time elapses from the departure time. The stop candidate may be searched for within a predetermined reference radius based on the location in which the vehicle is expected to be positioned after the second reference time elapses.

The stop candidate is searched for within the reference radius so that a driving time is prevented from being excessively increased due to excessive deviation from the driving path in order to pass the stop candidate. Therefore, the reference radius may be appropriately set within a range in which the driving time is not excessively increased. For example, the reference radius may be set in a range of 1 km to 10 km. When the reference radius is set, an absolute distance and a path for reaching the stop candidate may be considered. Further, traffic information may also be reflected. An embodiment reflecting the traffic information will be described in detail below.

When the vehicle 100 deviates from a path while running, the controller 130 may generate a new driving path according to the path deviation. When the driving path is newly generated, an expected location after the second reference time elapses from the departure time may be the same or may be changed. When the expected location after the second reference time elapses is changed, the controller 130 may search for the stop candidate again based on the changed location.

In addition, according to traffic conditions of the driving path, the location in which the vehicle is expected to be positioned after the second reference time elapses from the departure time may be changed. Therefore, the controller 130 determines whether a current location and an expected location are different after the second reference time elapses from the departure time or a predetermined time there before. When there is a difference, the stop candidate is searched for again based on the current location of the vehicle.

When the stop candidate is searched for, the controller 130 is also configured to reflect the user's preference. For example, the storage unit 140 stores the user's destination setting history or stop selection history, and the controller 130 may analyze the user's preference based on the stored destination setting history or stop selection history. For example, when the user most frequently sets a café (i.e. coffee shop/bar) as the destination or the stop during a predetermined period, it is determined that the user has high preference for café s and a café may be searched for as the stop.

The second reference time may be set in consideration of a time at which a break is necessary for safe driving along the way. For example, the second reference time may be set based on the first reference time. For example, since it is determined that safe driving will be interfered when the user continuously drives for 4 hours or more, when the first reference time is set to 4 hours, the second reference time may be set to 2 hours, as a mid-point thereof. However, in the embodiment of the present invention, the second reference time is not limited. Any determinable time at which a break is necessary for safe driving may be set as the second reference time without limitation to the above example.

Meanwhile, when it is determined that two or more breaks are necessary along the way since the estimated driving time is long, it is possible to pass stops twice or more. As a specific example, when the first reference time is set to 4 hours and the second reference time is set to 2 hours, if the estimated driving time is 10 hours, the driver needs to take a break at a time after 2 hours elapse from departure, and drive again for 8 hours. Therefore, the controller 130 may also set two or more stops according to the estimated driving time.

Specifically, the controller 130 determines whether the estimated driving time is a third reference time or more. When the estimated driving time is the third reference time or more, it is possible to search for a second stop candidate when the destination is set or after a first break. The third reference time may be set by the designer or the user in consideration of the first reference time and the second reference time, or may also be set by the controller 130 itself.

When it is possible to predict a break time at a first stop, the second stop candidate may be searched for when the destination is set, based on the departure time, the second reference time, and the break time. For example, the second stop candidate may be searched for based on a location in which the vehicle is expected to be positioned at a time after the second reference time+the break time+the second reference time elapses from the departure time. A method of searching for the second stop candidate is the same as that of the first stop candidate.

When it is difficult to predict a break time at a first stop candidate, the second stop candidate may be searched for after the break at the first stop. For example, when the vehicle 100 is turned off and turned on again after the second reference time elapses, or when the vehicle 100 does not move for a predetermined time or more and moves again after the second reference time elapses, the second stop candidate may be searched for based on a location in which the vehicle is expected to be positioned after the second reference time elapses from the time in which the vehicle is turned on again or moves again.

The controller 130 controls such that the display unit 150 displays a guide popup including information on the searched stop candidate. Therefore, the user may select whether the stop is passed or may select the stop. Hereinafter, an embodiment of displaying the guide popup and user selection will be described in detail.

Figure 3:
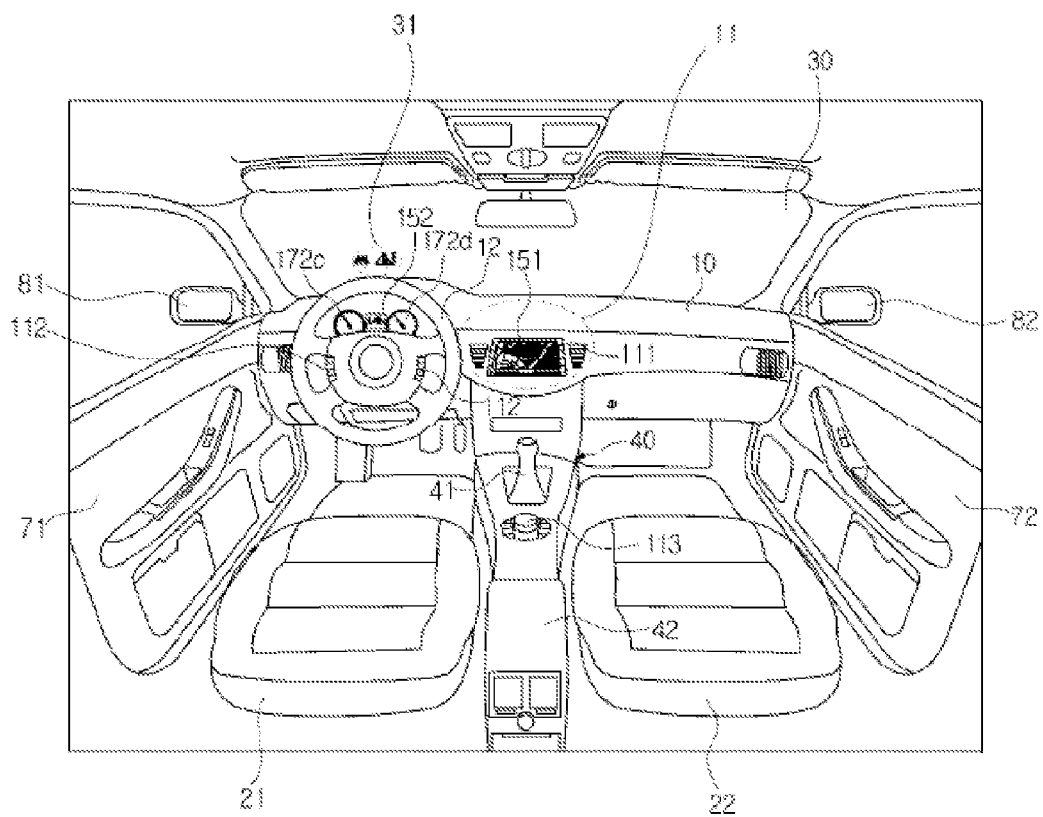
FIG. 3 is a diagram illustrating an internal configuration of the vehicle according to the embodiment of the present invention, wherein an input unit and a display unit are provided in the vehicle.
Figure 4:
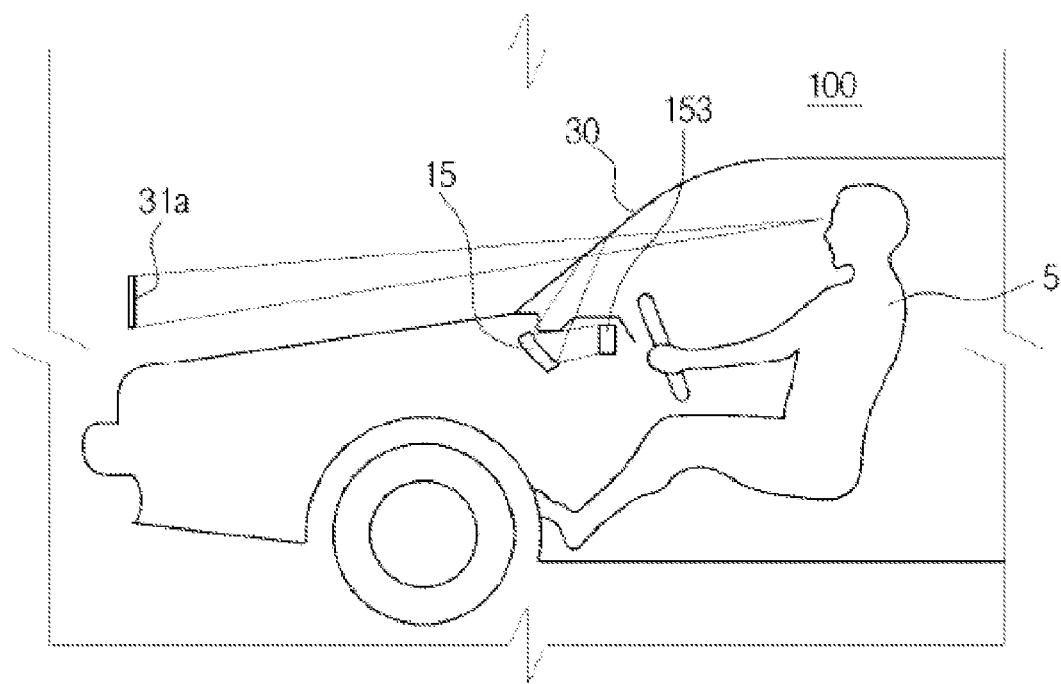
FIG. 4 is a diagram illustrating a configuration of a head up display (HUD) according to an embodiment of a display unit.

FIG. 3 is a diagram illustrating an internal configuration of the vehicle according to the embodiment of the present invention, wherein an input unit and a display unit are provided in the vehicle. FIG. 4 is a diagram illustrating a configuration of a head up display (HUD) according to an embodiment of a display unit.

As illustrated in FIG. 3, the vehicle 100 may include an audio video navigation (AVN) display 151 and a cluster display 152 as a display device for user convenience.

The AVN display 151 is provided in a center fascia 11 of a dashboard 10 in the front of the vehicle 100 such that the user may see or manipulate a displayed image while driving, and may display a screen related to an audio function, a screen related to a video function or a screen related to a navigation function. The center fascia 11 refers to a center area of the dashboard 10 in which a control panel board between a driver seat 21 and a passenger seat 22 is positioned.

In addition, although not illustrated, the vehicle 100 includes a speaker capable of outputting a sound, and may output a sound along with the image when the audio function, the video function and the navigation function are performed.

The AVN display 151 may be implemented by a liquid crystal display (LCD), a light emitting diode (LED), a plasma display panel (PDP), an organic light emitting diode (OLED), a cathode ray tube (CRT), and the like.

The cluster display 152 displays information on the vehicle 100, in particular, information on driving of the vehicle 100. The cluster display 152 may be provided in an area facing a steering wheel 12 out of an area of the dashboard 10 such that the user may check information on the vehicle without his or her field of view excessively deviating from the front of the vehicle while driving. Exemplary displayed information includes driving information indicating a driving range based on a residual fuel amount, a driving distance from a reset location, and the like, navigation information, audio information, and the like.

A speed gauge 172c indicating a speed of the vehicle and a rotation per minute (RPM) gauge 172d indicating RPM of the motor are displayed together in an area adjacent to the cluster display 152 such that the user may check information on the vehicle at a glance.

The cluster display 152 may also be implemented by an LCD, an LED, a PDP, an OLED, a CRT, and the like.

An HUD 153 displays information through the front glass 30 such that the user may check necessary information while maintaining a forward gaze while driving. As illustrated in FIG. 3, since information on the vehicle is displayed through a display area 31 of the front glass 30, the user may check information displayed through the display area 31 while mostly maintaining a forward gaze while driving.

As illustrated in FIGS. 3 and 4, the HUD 153 may be provided in the front of the vehicle 100 and a reflecting plate 15 may be provided in front of the HUD 153. When the HUD 153 outputs an image forward, the output image is reflected at the reflecting plate 15 and is projected onto the front glass 30.

The projected image is reflected at the front glass 30 and delivered to eyes of a driver 5. As illustrated in FIG. 3, the driver 5 may see the image through the display area 31 of the front glass 30, but the image delivered to eyes of the driver 5 is actually a virtual image 31a formed outside the front glass 30.

However, configurations of the HUD 153 and the reflecting plate 15 illustrated in FIG. 4 are only examples of the present invention. A plurality of reflecting plates 15 may be provided, no reflecting plate 15 may be provided, or an additional diffractive element may be provided.

The display unit 150 may include at least one of the AVN display 151, the cluster display 152 and the HUD 153 described with reference to FIGS. 3 and 4. That is, the controller 130 may display a guide popup for guiding information on the stop on at least one of the AVN display 151, the cluster display 152, and the HUD 153.

For example, when the display unit 150 includes the AVN display 151, the cluster display 152 and the HUD 153, the guide popup may be selectively displayed on one of the AVN display 151, the cluster display 152 and the HUD 153 depending on types of the guide popup. Details thereof will be described below.

The vehicle 100 may include the input unit 110 configured to receive a command for controlling the vehicle 100 from the user. As illustrated in FIG. 3, the input unit 110 may include at least one of a first input unit 111, a second input unit 112 and a third input unit 113.

The first input unit 111 may be provided in an area adjacent to the AVN display 151 and in the form of a hard key. When the AVN display 151 is implemented in the form of a touch screen, the first input unit 111 may be provided in a part of the AVN display 151 in the form of a soft key.

The second input unit 112 is provided in a part of the steering wheel 12 in the form of the hard key such that the driver may manipulate the input unit while grasping the steering wheel 12. Alternatively, the second input unit 112 may be provided behind the steering wheel 12 and in the form of a lever such that the user may input a command through manipulation such as pulling the lever forward, pushing the lever backward, raising the lever, or lowering the lever.

The third input unit 113 may be a jog shuttle or a joystick provided in a center console 40 located between the driver seat 21 and the passenger seat 22. The center console 40 refers to a part in which a gear lever 41 and a tray 42 for accommodating goods are formed. When the third input unit 113 is implemented by the jog shuttle, the user may input a command through manipulation such as pulling or pushing the jog shuttle forward or backward and to the left or right or rotating the jog shuttle.

Specifically, the first input unit 111 may receive a command related to the audio function, the video function or the navigation function from the user. The user may manipulate the first input unit 111 to turn the audio, the video or the navigation on and off. When the audio is turned on, the user may manipulate the first input unit 111 to select a radio channel or a music file. When the video is turned on, the user may manipulate the first input unit 111 to select a digital multimedia broadcasting (DMB) channel, or load or reproduce a file stored in a digital video disk (DVD) or a universal serial bus (USB).

In addition, when the navigation is turned on, the user may manipulate the first input unit 111 to input information on destination setting, or input information on selecting whether the stop is passed or setting the stop as will be described below. Inputting information on destination setting may include, inputting a destination name, a destination address, or a destination phone number, selecting a recent destination, or selecting a destination registered as a favorite. A method of inputting information on destination setting is not limited thereto, and other input methods may also be applied.

The second input unit 112 may receive a command related to information to be displayed on the cluster display 152 or the HUD 153 from the user. For example, the second input unit 112 may receive a command related to whether driving information, audio information, or navigation information of the vehicle to be displayed on the cluster display 152 or the HUD 153.

In addition, the second input unit 112 may perform a function that partially overlaps a function of the first input unit 111. When the audio is turned on, the user may manipulate the second input unit 112 to select a radio channel or a music file. When the video is turned on, the user may manipulate the second input unit 112 to select a DMB channel, or load or reproduce a file stored in a DVD or a USB.

In addition, when the navigation is turned on, the user may manipulate the second input unit 112 to input information on destination setting, or select whether the stop is passed or set the stop as will be described below.

The third input unit 113 may perform at least one of functions of the first input unit 111 and the second input unit 112 described above.

The input unit 110 of the vehicle 100 according to the embodiment of the present invention may include one, two, or all of the first input unit 111, the second input unit 112 and the third input unit 113. Accordingly, the input unit 110 in the embodiment to be described refers to any of the first input unit 111, the second input unit 112, and the third input unit 113.

FIGS. 5 to 8 are diagrams illustrating exemplary guide popups displayed on the display unit.

As described above, when the user inputs information on destination setting through the input unit 110, the controller 130 generates a driving path from a departure position/location to a destination, calculates the estimated driving time for the driving path, compares it with the first reference time, and searches for a stop candidate.

The guide popup including information on the searched stop candidate is displayed on the display unit 150. In the present embodiment, the guide popup is displayed on the AVN display 151 out of the display unit 150 described above, and the second reference time is set to a predetermined period, such as 2 hours for example.

Figure 5:
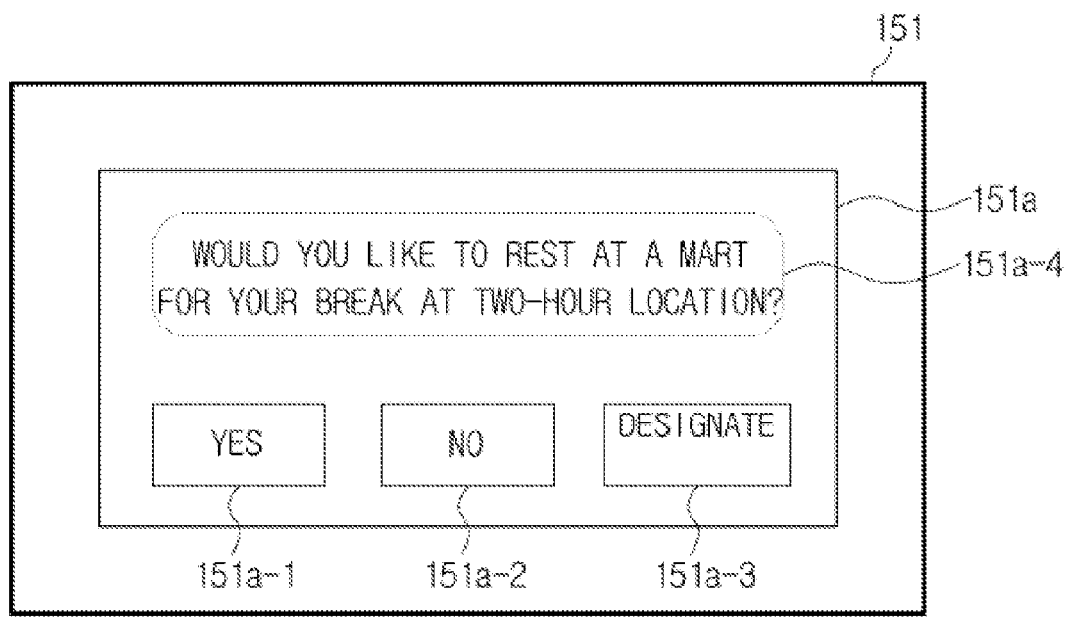
FIGS. 5 to 8 are diagrams illustrating exemplary guide popups displayed on the display unit.

As illustrated in FIG. 5, in one exemplary embodiment, the AVN display 151 displays a phrase 151a-4 for checking whether the user takes a break in the stop candidate (A Mart in this example) searched for break at a 2-hour location, and a guide popup 151a including a Yes button 151a-1, a No button 151a-2, and another stop designation button 151a-3 for receiving the user's selection.

The Yes button 151a-1 is a button for selecting the searched stop candidate. The No button 151a-2 is a button for selecting not to stop, that is, to pass the stop candidate. The other stop designation button 151a-3 is a button for selecting another stop candidate as the stop instead of the searched stop candidate.

The user may select one of the Yes button 151a-1, the No button 151a-2 and the other stop designation button 151a-3. When the input unit 110 is implemented in the form of a touch screen, selection may be performed by touching a desired corresponding button. When the input unit 110 is implemented in the form of a hard key or a jog shuttle, selection may be performed by manipulating the hard key or the jog shuttle.

Meanwhile, when a plurality of stop candidates are searched for within the reference radius, only one stop candidate may be displayed on the AVN display 151 by reflecting the user's preference or selecting any one. However, as illustrated in FIGS. 6 and 7, buttons 151a-5, 151a-6, 151a-7, and 151a-8 may be displayed so that the user may directly select one out of the plurality of stop candidates.

Figure 6:
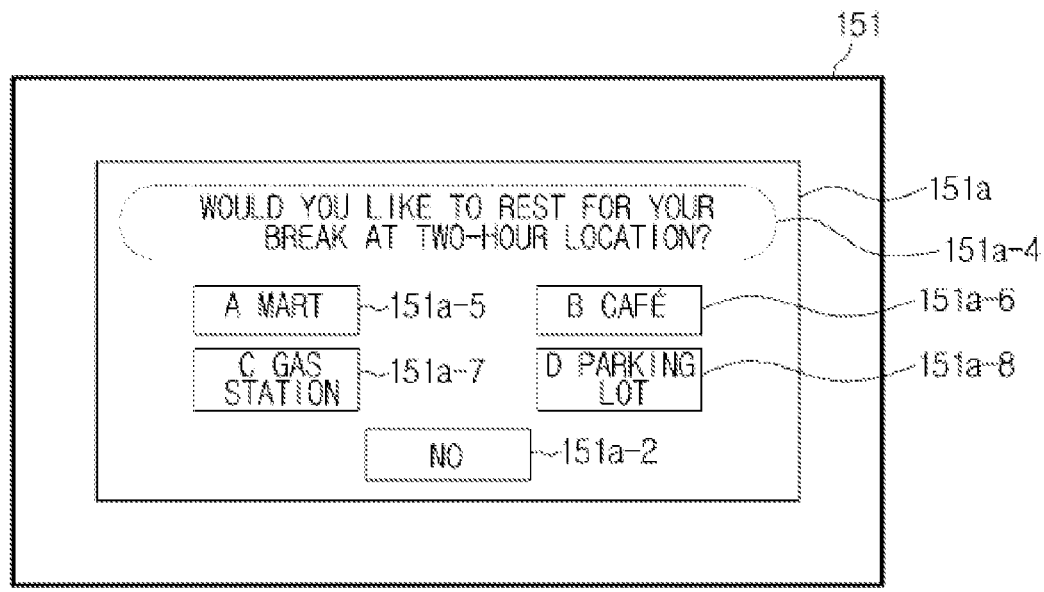
Figure 7:
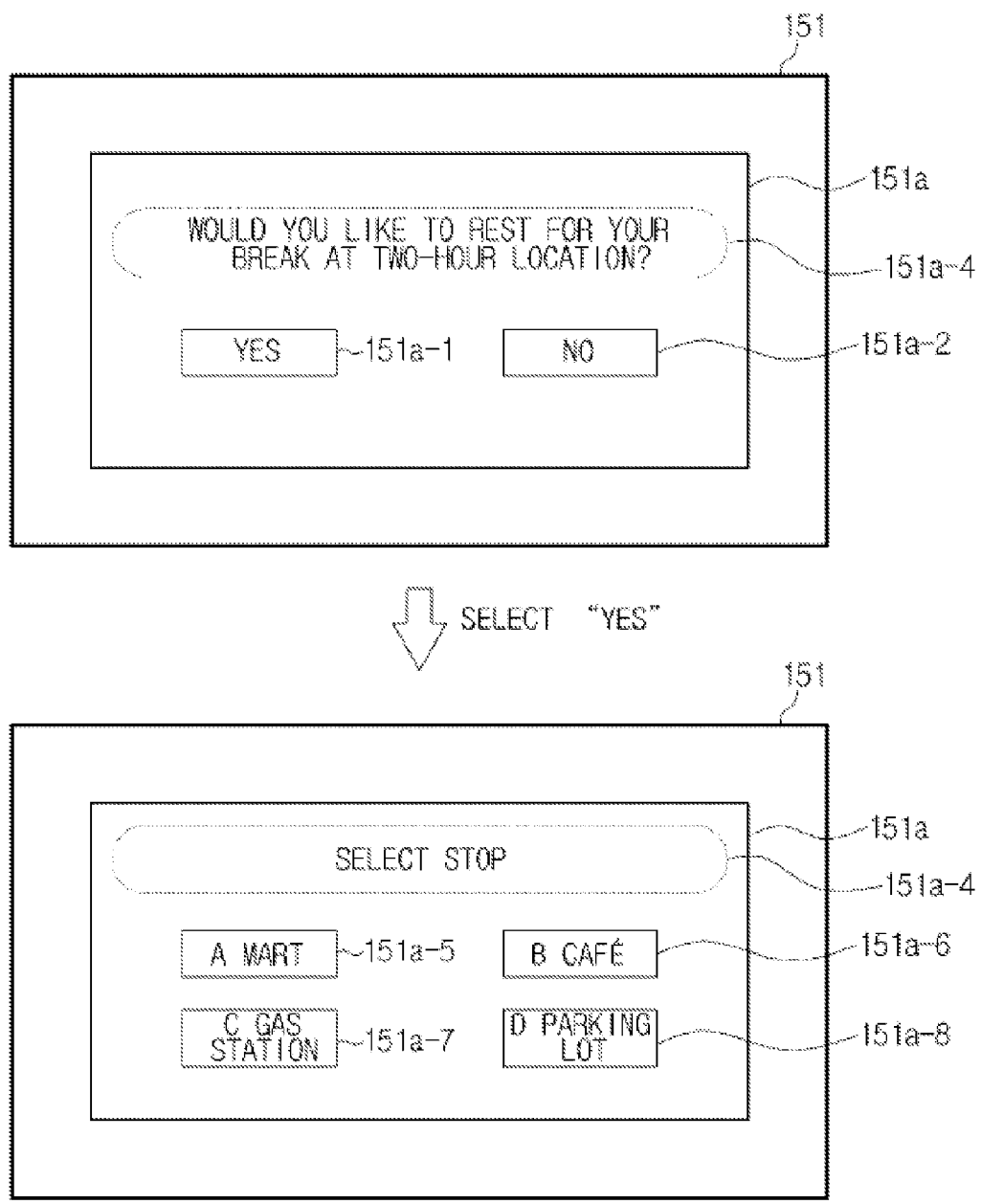

A difference between the guide popup 151a illustrated in FIG. 6 and the guide popup 151a illustrated in FIG. 7 is that selecting the stop candidate is performed in one step according to the guide popup 151a illustrated in FIG. 6, and selecting the stop candidate is performed in two steps according to the guide popup 151a illustrated in FIG. 7 such that, when the user selects the Yes button 151a-1, the guide popup 151a for selecting the stop candidate is displayed again.

When the user selects the Yes button 151a-1 in the guide popup 151a illustrated in FIG. 5 or the user selects the stop candidate (A Mart in this example) in the guide popup 151a illustrated in FIGS. 6 and 7, the controller 130 guides the vehicle 100 to A Mart when the second reference time elapses from the departure time.

Specifically, the controller 130 sets the stop candidate selected by the user as the stop, and guides the vehicle 100 to reach the destination via the set stop. When the set stop is located on the driving path, the controller 130 guides the vehicle 100 along the driving path. When the vehicle reaches the set stop candidate, arrival at the stop is notified of. When the set stop candidate is not located on the driving path, the controller 130 may generate a new driving path that can pass the set stop candidate and guide the vehicle 100 to the newly generated driving path.

Guiding along the driving path is performed such that an icon indicating a current position of the vehicle 100 and a driving path line indicating the driving path to the stop candidate are overlaid and displayed on the map displayed on the AVN display 151, and a voice guide is output through the speaker.

When the user selects the No button 151a-2, the controller 130 does not automatically guide the vehicle 100 to A Mart even when the second reference time elapses from the departure time. As will be described below, when the second reference time elapses, a current driving time may be announced or a guide for taking a break may be performed once again.

Figure 8:
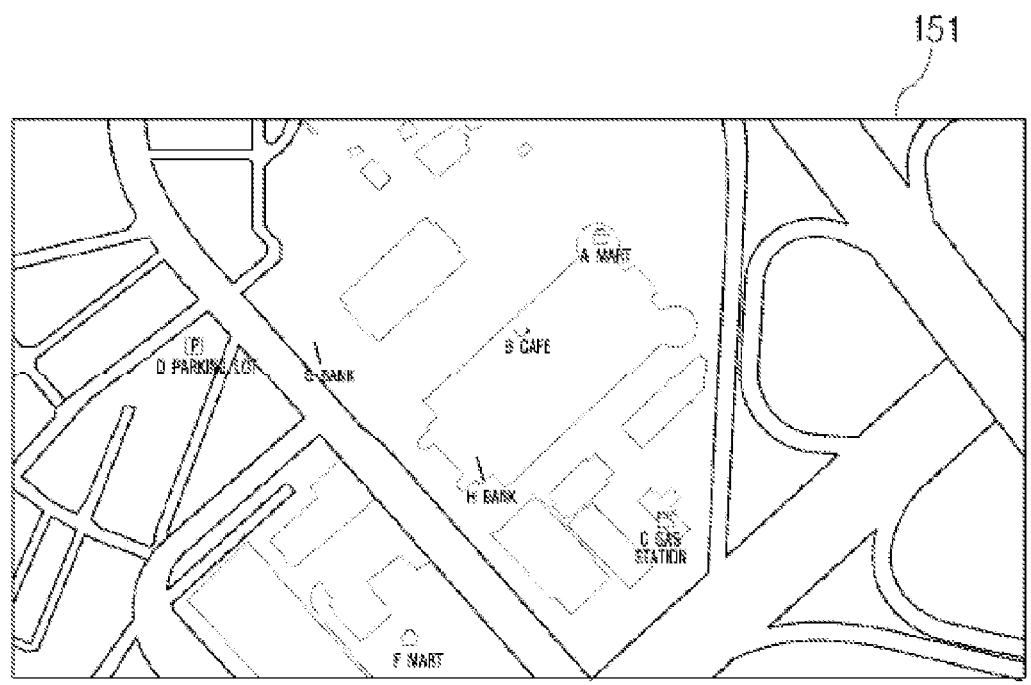

When the user selects the other stop designation button 151a-3, the AVN display 151 displays a screen which enables the user to select another stop candidate. For example, as illustrated in FIG. 8, in addition to a map of an area including a location in which the vehicle is expected to be positioned after the second reference time elapses, another stop candidate may be overlaid and displayed on a position on a map corresponding thereto.

The user may select another stop candidate displayed on the AVN display 151. When the user's selection is input, the controller 130 sets the selected stop candidate as the stop, and guides the vehicle 100 to the set stop when the second reference time elapses.

In addition, when the user selects another stop candidate, other stop candidates may be displayed in the form of a list as in the guide popup 151a illustrated on the bottom of FIG. 7. On the other hand, when the user selects the Yes button 151a-1 in the guide popup 151a illustrated on the top of FIG. 7, other stop candidates may be displayed in the form of a map as illustrated in FIG. 8.

Figure 9:
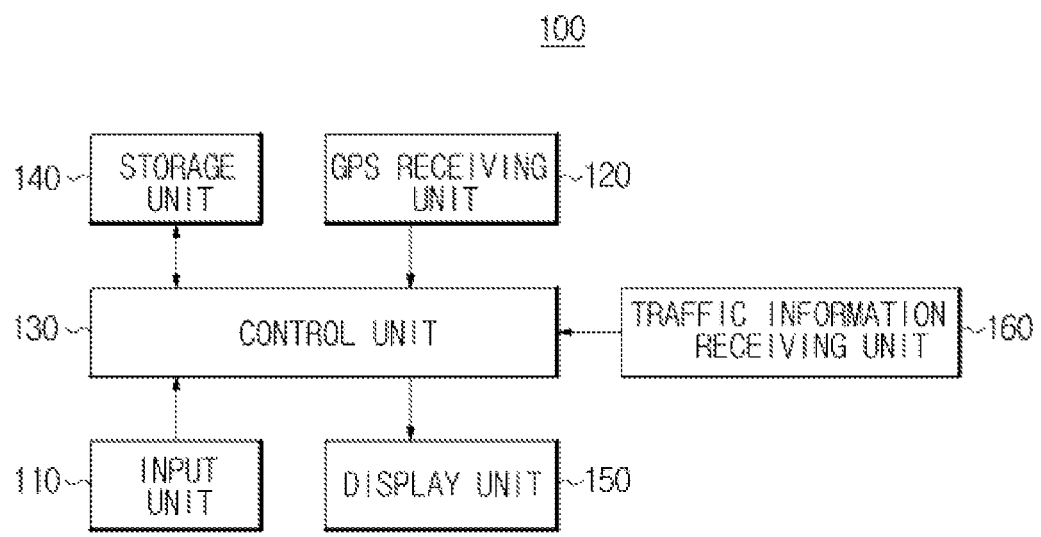
FIG. 9 is a control block diagram of a vehicle according to an embodiment of the present invention, wherein a traffic information receiving unit is further included in the vehicle.

FIG. 9 is a control block diagram of a vehicle according to an embodiment of the present invention, wherein a traffic information receiving unit is further included in the vehicle.

As illustrated in FIG. 9, the vehicle 100 may further include a traffic information receiving unit 160 configured to receive traffic information from the outside. As an example, the traffic information receiving unit 160 may receive Transport Protocol Experts Group (TPEG) data. The TPEG data includes real-time traffic information transmitted through DMB broadcasting frequencies and may also include travel information or point of interest (POI) information.

As another example, the traffic information receiving unit 160 may receive traffic information from a server providing traffic information via a mobile communication network. In this case, the traffic information receiving unit 160 may include a radio frequency (RF) communication module or a Wi-Fi module.

When the driving path from a departure position to a destination is generated, the controller 130 may reflect the traffic information received by the traffic information receiving unit 160. That is, the driving path having the smallest estimated driving time may be generated by reflecting the traffic information. In addition, when the estimated driving time is calculated, the traffic information may also be reflected.

Since the traffic information receiving unit 160 may receive the real-time traffic information, the controller 130 is configured to reflect the traffic information in real time during driving and generate the driving path again. When the driving path is changed, the controller 130 is configured to search for the stop candidate again based on a location in which the vehicle is expected to be positioned after the second reference time elapses from the departure time, and to display a guide popup 151a related to the re-searched stop candidate on the display unit 150.

In addition, the controller 130 is configured to reflect the traffic information when the stop candidate is searched for. When the stop candidate is searched for at the time of destination setting, the traffic information may be reflected. Even when the vehicle 100 drives, the traffic information may be reflected at predetermined times or predetermined intervals to re-search for the stop candidate.

Figure 10:
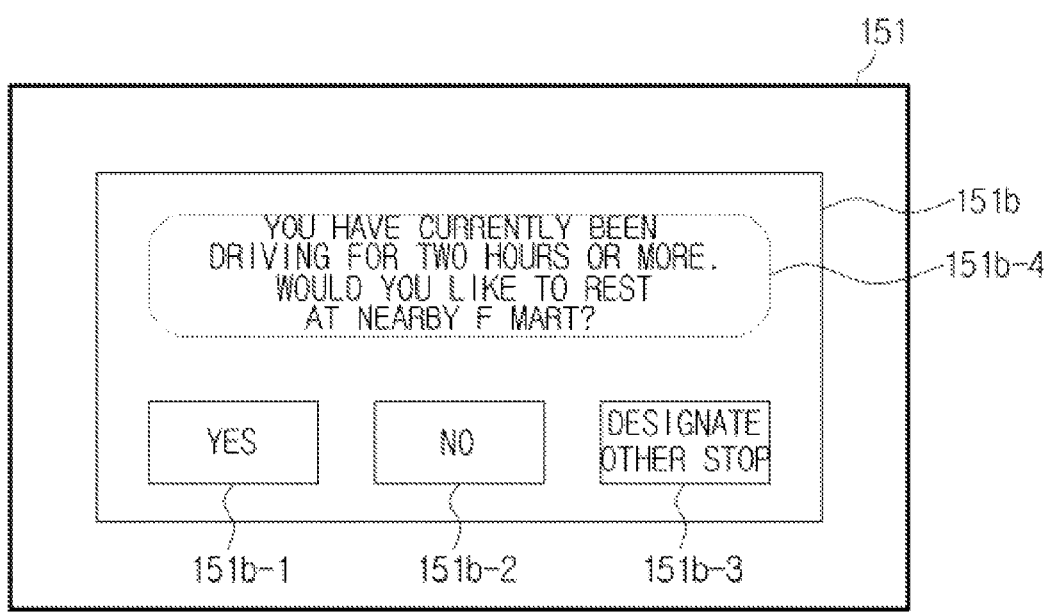
FIGS. 10 and 11 are diagrams illustrating a guide popup that can be displayed on a display unit after a second reference time elapses from a departure time.
Figure 11:
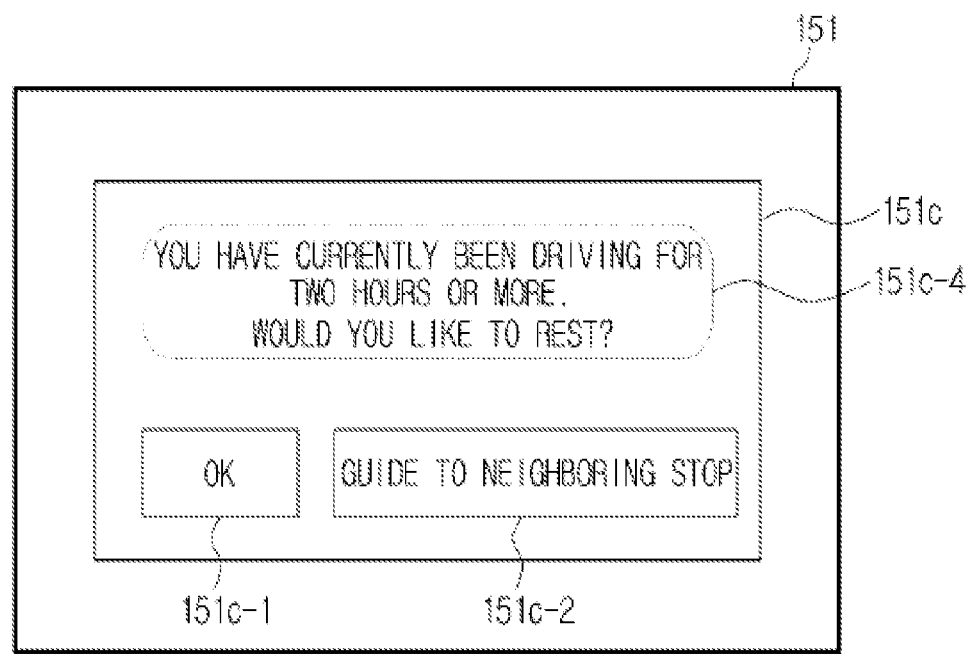

FIGS. 10 and 11 are diagrams illustrating a guide popup that can be displayed on a display unit after a second reference time elapses from a departure time.

In the above example, when the destination is set, information about the stop candidate is provided to the user to select whether the stop candidate is passed. In another example, no guide popup may be displayed when the destination is set, and the guide popup may be displayed after the second reference time elapses.

When it is assumed that the second reference time is set to a predetermined period of time, such as 2 hours for example, if the second reference time elapses from the departure time, a current driving time guide and a guide popup 151b for checking stops again may be displayed on the display unit 150. In this example, the display unit 150 is the AVN display 151.

The guide popup 151b displays a phrase 151b for checking whether the user takes a break at the neighboring stop (F Mart in this example) because the user has driven for 2 hours or more, and the guide popup 151b including a Yes button 151b-1, a No button 151b-2, and an other stop designation button 151b-3 for receiving the user's selection. Functions of each button are the same as those of the Yes button 151a-1, the No button 151a-2, and the other stop designation button 151a-3 illustrated in FIG. 5.

F Mart may be a stop searched for when the destination is set, or a newly searched stop after the second reference time elapses.

The user may select one of the Yes button 151b-1, the No button 151b-2 and the other stop designation button 151b-3. When the user selects the Yes button 151b-1, the controller 130 guides the vehicle 100 directly to F Mart. When the user selects the No button 151b-2, the controller 130 continues to guide the vehicle to the destination.

When the user selects the other stop designation button 151b-3, the map including the stop candidate is displayed on the AVN display 151 such that the user may select a desired stop candidate as described in FIG. 8. Alternatively, other stop candidates may be displayed in the form of a list.

As another example, as illustrated in FIG. 11, a phrase 151c-4 for checking whether the user takes a break because the user has currently driven for 2 hours or more, and a guide popup 151c including an OK button 151c-1 and a neighboring stop guide button 151c-2 may be displayed.

When the user selects the OK button 151c-1, the guide popup 151c disappears, and the user selects whether the stop candidate is to be passed or selects the stop candidate. When the user selects the neighboring stop guide button 151c-2, a guide popup including a stop candidate list may be displayed as illustrated on the bottom of FIG. 7, or a map including a position of the stop candidate may be displayed as illustrated in FIG. 8.

As illustrated in FIG. 6, the stop candidate list and the No button may also be included in one guide popup 151.

Meanwhile, even when the guide popup 151a is displayed at the time of destination setting as illustrated in FIGS. 5 to 7 and the user selects the No button 151a-2, the driver may get tired and feel that a stop is necessary after long-term driving. Therefore, even when the user selects the No button 151a-2 at the time of destination setting, the guide popup 151a may be displayed after the second reference time elapses as illustrated in FIG. 10 or 11 such that the user may be guided to the stop.

Figure 12:
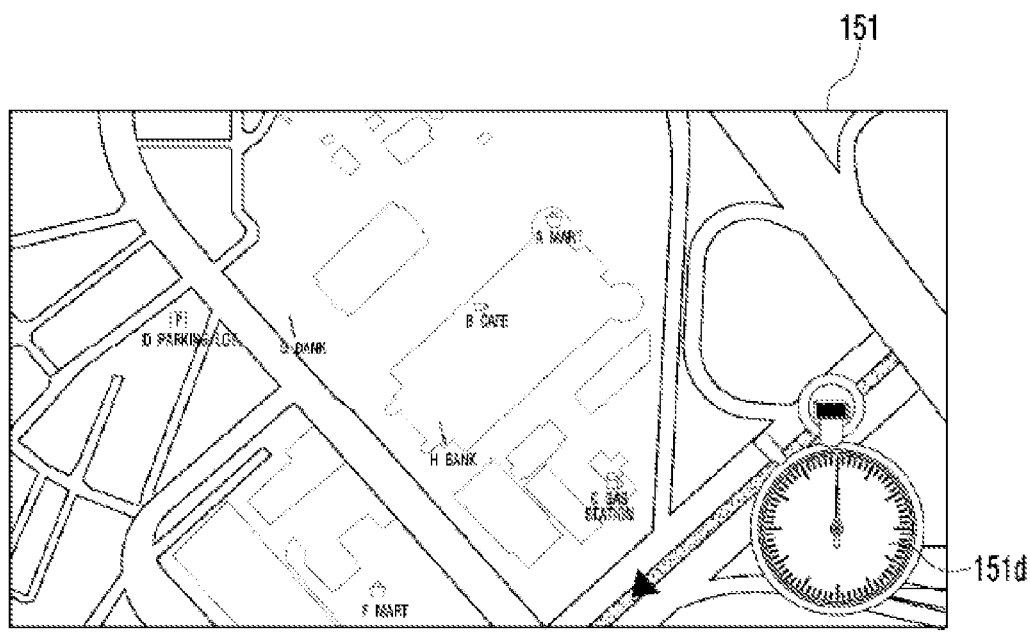
FIG. 12 is a diagram illustrating an audio video navigation (AVN) display on which a timer is displayed on a map for guiding a driving path.

FIG. 12 is a diagram illustrating an AVN display on which a timer is displayed on a map for showing a driving path.

When the vehicle 100 begins to run, the AVN display 151 displays a driving path guide screen for guiding the vehicle 100 to the destination according to the driving path generated by the controller 130. As illustrated in FIG. 12, in the driving path guide screen, the driving path and a current position of the vehicle 100 may be overlaid and displayed on a map of a predetermined area including the current position.

In addition, the controller 130 may display a timer 151d indicating a driving time in a part of the driving path guide screen. As a specific example, the timer 151d may be displayed on the AVN display 151 when the second reference time elapses from the departure time, and the user may be informed that he or she has currently driven for the second reference time. At this time, a notification sound may also be output through the speaker.

Alternatively, the timer 151*d* may be displayed on the AVN display 151 when driving starts so that the user may be informed of elapse of the driving time. When the second reference time elapses, vibration of the timer 151*d* may be visually displayed or the notification sound may be output through the speaker.

Meanwhile, in the embodiments described above, the phrase and the buttons included in the guide popups 151*a*, 151*b*, and 151*c* were described using detailed examples illustrated in FIGS. 5 to 8 and 10 to 12. However, these are only examples that can be applied to the embodiment of the present invention. Therefore, a configuration such as detailed phrases or buttons included in the guide popup 151 has no limitation, as long as functions of each guide popup such as checking stops, selecting the stop, providing a current driving time, or the like can be performed.

Figure 13:
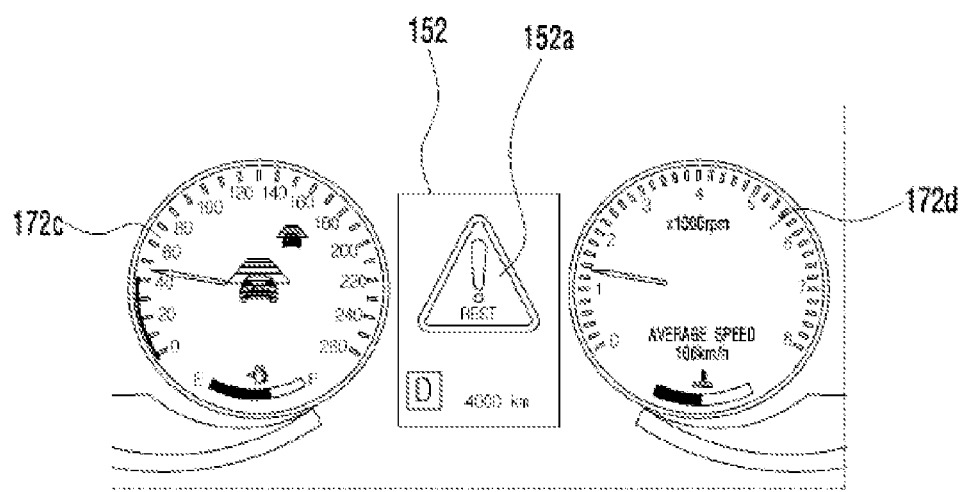
FIGS. 13 and 14 are diagrams illustrating an exemplary guide popup displayed on a cluster display.
Figure 14:
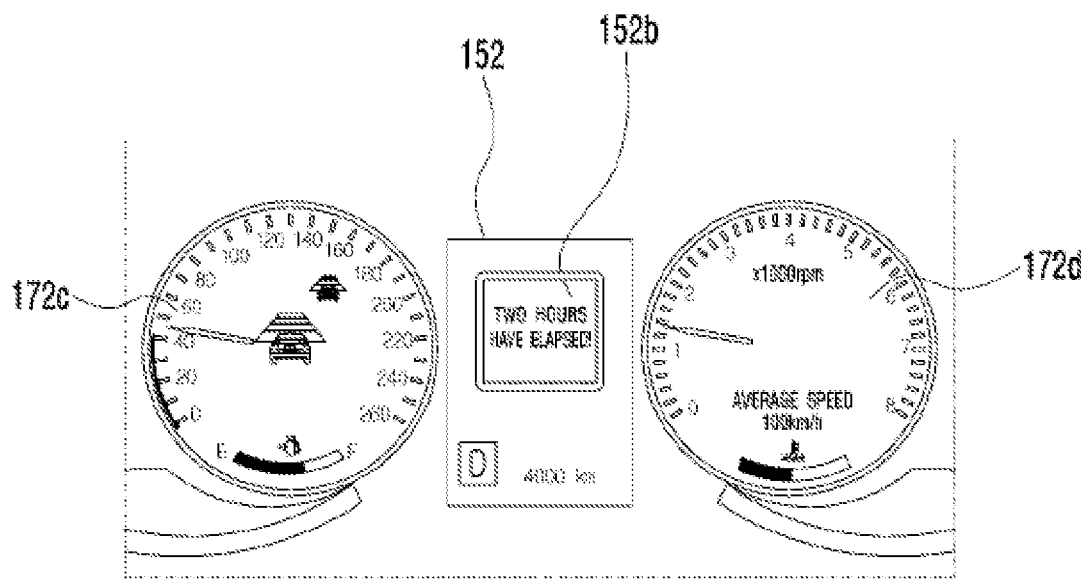

FIGS. 13 and 14 are diagrams illustrating an exemplary guide popup displayed on a cluster display.

As illustrated in FIGS. 13 and 14, when the second reference time elapses from the departure time, the controller 130 may display a guide popup 152*a* for directly or indirectly indicating necessity of a break on the cluster display 152. As described above, the user may check the cluster display 152 without a field of view excessively deviating from the front of the vehicle. Therefore, when the guide popup 152*a* is displayed on the cluster display 152, the user may easily check content included in the guide popup 152*a*.

The content displayed on the guide popup 152*a* may include a phrase or a symbol for directly indicating that a break is currently necessary as illustrated in FIG. 13. The content may include a phrase in which a driving time up to now is provided to indirectly indicate necessity of a break as illustrated in FIG. 14. The content displayed on the guide popup 152*a* has no limitation, as long as the content can prompt the user to take a break.

Figure 15:
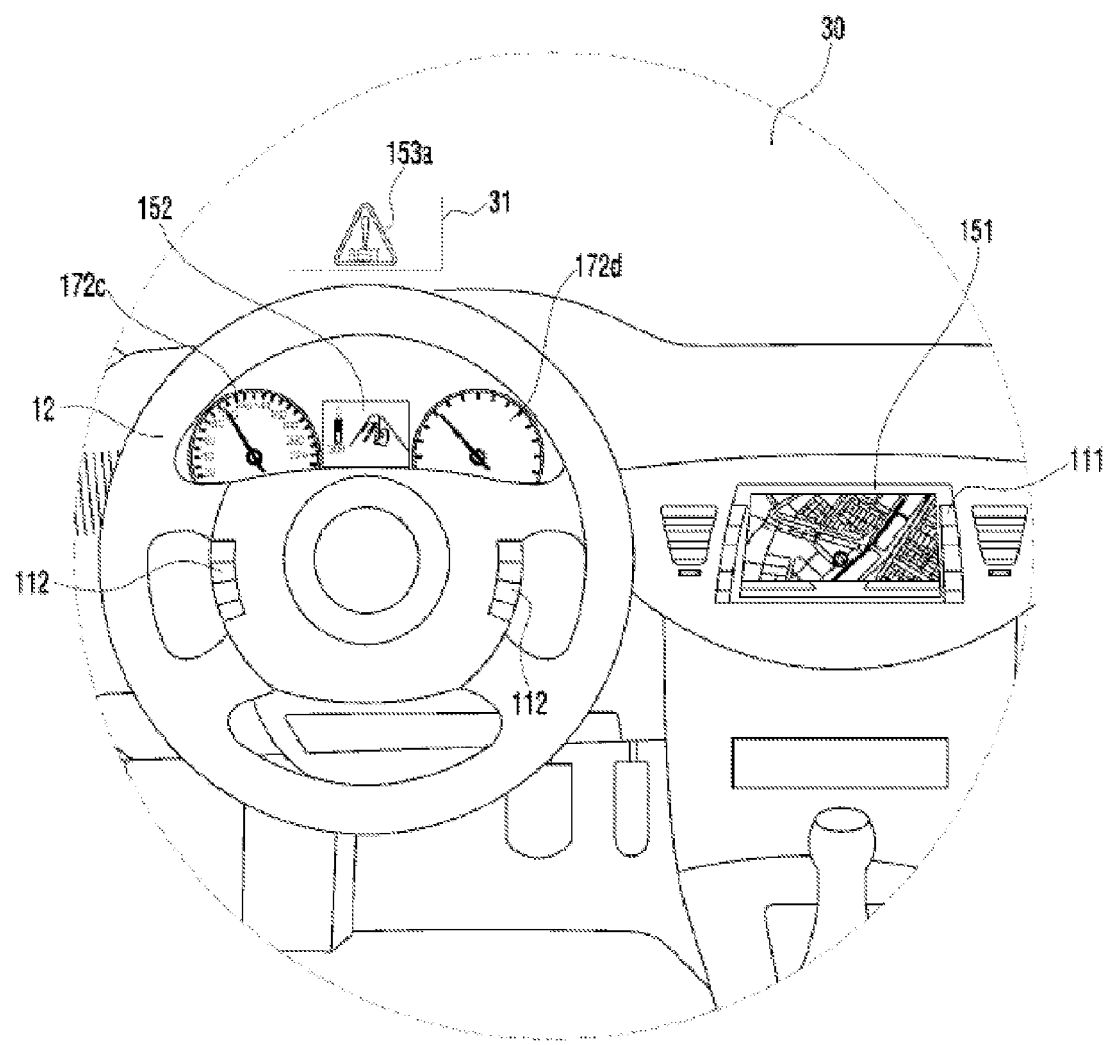
FIGS. 15 and 16 are diagrams illustrating an exemplary guide popup displayed on the HUD.
Figure 16:
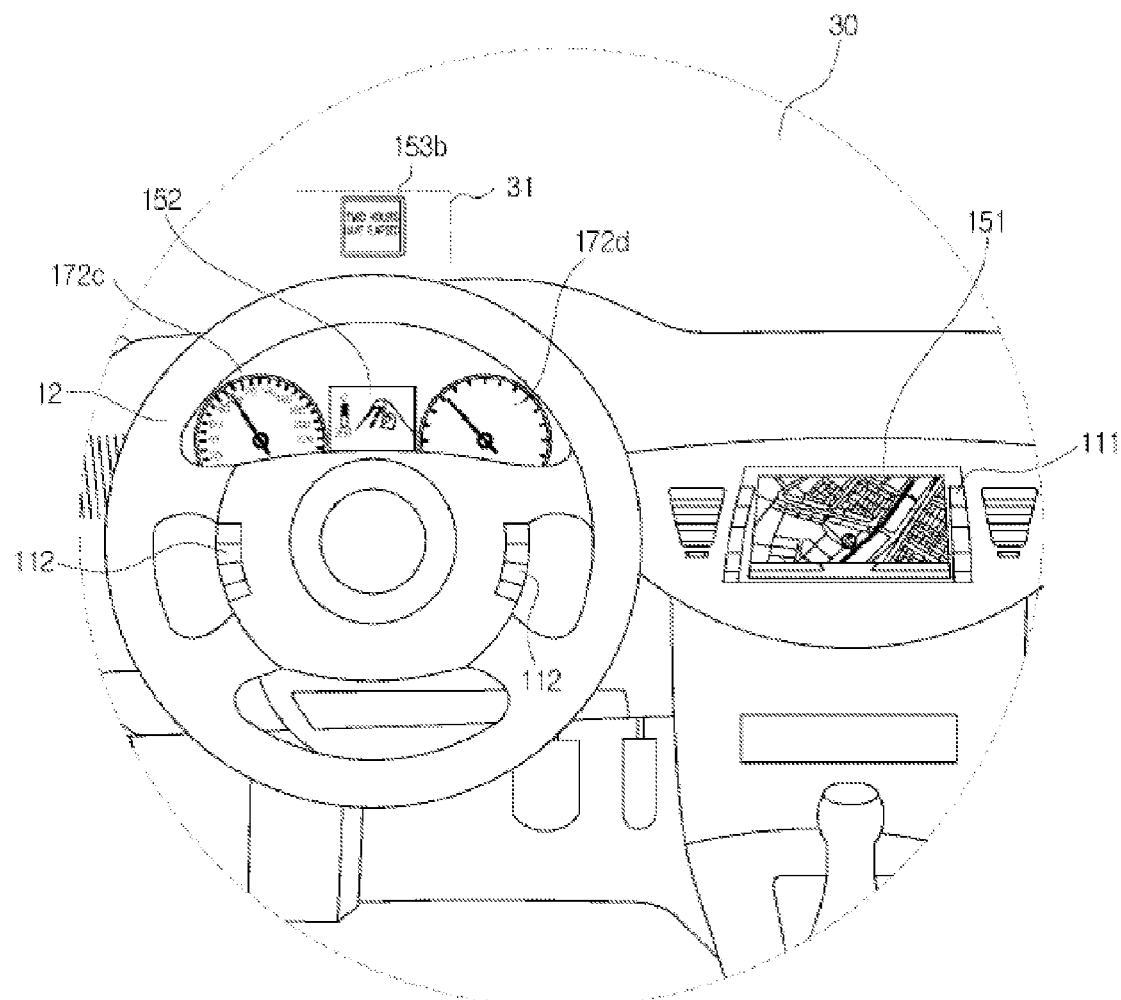

FIGS. 15 and 16 are diagrams illustrating an exemplary guide popup displayed on the HUD.

When the second reference time elapses from the departure time, the controller 130 may display a guide popup 153 for directly or indirectly indicating that a break is necessary on the HUD 153. The guide popup 153 displayed on the HUD 153 is displayed through the display area 31 of the front glass 30 as illustrated in FIGS. 15 and 16.

As described above, since the user may check the HUD 153 while maintaining a forward gaze, when the guide popup 153*a* is displayed on the HUD 153, the user may check the content included in the guide popup 153*a* more securely.

The content displayed on the guide popup 153*a* may be a phrase or a symbol for directly indicating that a break is currently necessary as illustrated in FIG. 15. The content may include a phrase in which a driving time up to now is provided to indirectly indicate necessity of a break as illustrated in FIG. 16. The content displayed on a guide popup 156*a* has no limitation, as long as the content can prompt the user to take a break.

Meanwhile, the guide popup illustrated in FIGS. 13 to 16 may be displayed when the user selects whether the stop is passed at the time of destination setting or selects not to stop.

In addition, the guide popup indicating necessity of a break is displayed on the cluster display 152 or the HUD 153 in FIGS. 13 to 16, but may be displayed on the AVN display 151.

Hereinafter, a method of controlling a vehicle according to an embodiment of the present invention will be described. In the method of controlling a vehicle according to an embodiment of the present invention, the vehicle 100 according to the above embodiment may be applied. Accordingly, the drawings related to the embodiment of the vehicle 100 may also be applied to the method of controlling a vehicle according to the embodiment of the present invention.

Figure 17:
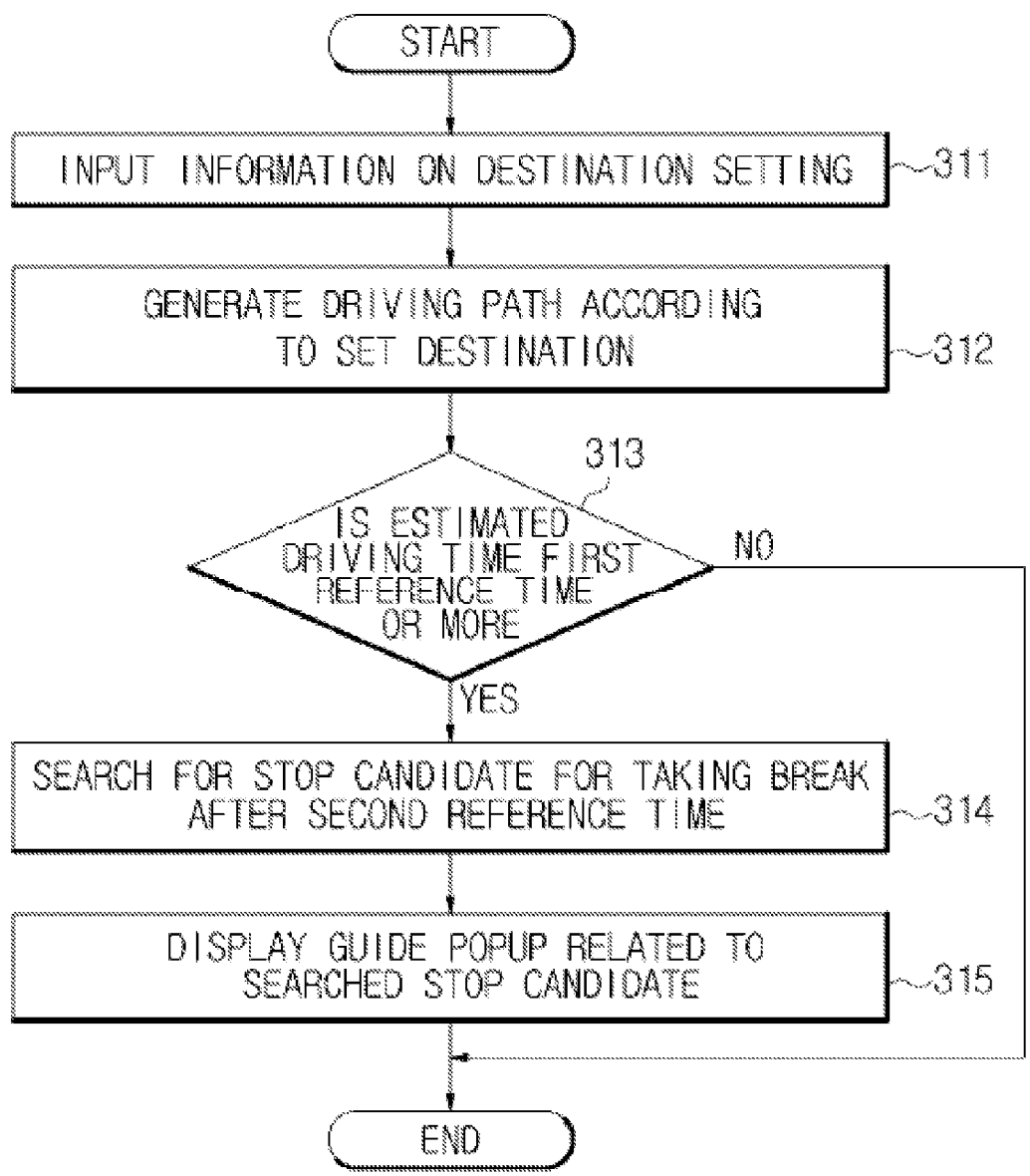
FIG. 17 is a flowchart illustrating a method of controlling a vehicle according to an embodiment of the present invention.

FIG. 17 is a flowchart illustrating a method of controlling a vehicle according to an embodiment of the present invention.

As illustrated in FIG. 17, information on destination setting is input by a user, at Step 311, and the driving path according to the set destination is generated, at Step 312. The driving path is a path from a departure position to a destination. The departure position may be a current position of the vehicle 100 received from the GPS receiving unit 120 or a position separately set by the user. If the vehicle 100 can receive traffic information, the received traffic information may be reflected when the driving path is generated.

An estimated driving time for the generated driving path is calculated and it is determined whether the estimated driving time is the first reference time or more, at Step 313. The first reference time is a time serving as a reference used to determine when the driver's continuous driving interferes with safe driving, and may be set by a designer or set or changed by the user. In addition, when a regulation on long-term driving is set, it is possible to set the first reference time by following the regulation. If the vehicle 100 can receive the traffic information, the received traffic information may be reflected when the estimated driving time is calculated.

When the estimated driving time is the first reference time or more, a stop candidate for taking a break after the second reference time is searched for, at Step 314. Specifically, the stop candidate is searched for based on a location in which the vehicle is expected to be positioned after the second reference time elapses from the departure time. The stop candidate may be searched for within a predetermined reference radius based on the location in which the vehicle is expected to be positioned after the second reference time elapses. The second reference time may be set in consideration of a time at which a break is necessary for safe driving along the way.

The stop candidate may be located on the driving path or a location adjacent to the driving path. The stop candidate may include any place in which the user stops or parks the vehicle and takes a break, for example, a rest area, a parking lot, a restaurant, a café, a gas station, a park, and a mart.

A guide popup related to the searched stop candidate is displayed, at Step 315. The guide popup includes content in which the user selects whether he or she stops after the second reference time, selects whether the searched stop candidate is set as the stop, or selects another stop candidate. Since the content related to displaying of the guide popup is the same as those in FIGS. 5 to 8, description thereof will not be repeated.

Meanwhile, when it is determined that a break is necessary twice or more along the way since the estimated driving time is long, passing the stop twice or more is possible. Specifically, it is determined whether the estimated driving time is the third reference time or more. When the estimated driving time is the third reference time or more, the second stop candidate may be searched for at the time of destination setting or after a first break.

When a break time at the first stop can be predicted, the second stop candidate may be searched for at the time of destination setting based on the departure time, the second reference time and the break time. For example, the second stop candidate may be searched for based on a location in which the vehicle is expected to be positioned at a time after the second reference time+the break time+the second reference time elapses from the departure time. A method of searching for the stop candidate is the same as that of a first stop candidate.

When it is difficult to predict a break time at a first stop, the second stop candidate may be searched for after the break at the first stop. For example, when the vehicle 100 is turned off and turned on again after the second reference time elapses, or when the vehicle 100 does not move for a predetermined time or more and moves again after the second reference time elapses, the second stop candidate may be searched for based on a location in which the vehicle is expected to be positioned after the second reference time elapses from the time at which the vehicle is turned on again or moves again.

Figure 18:
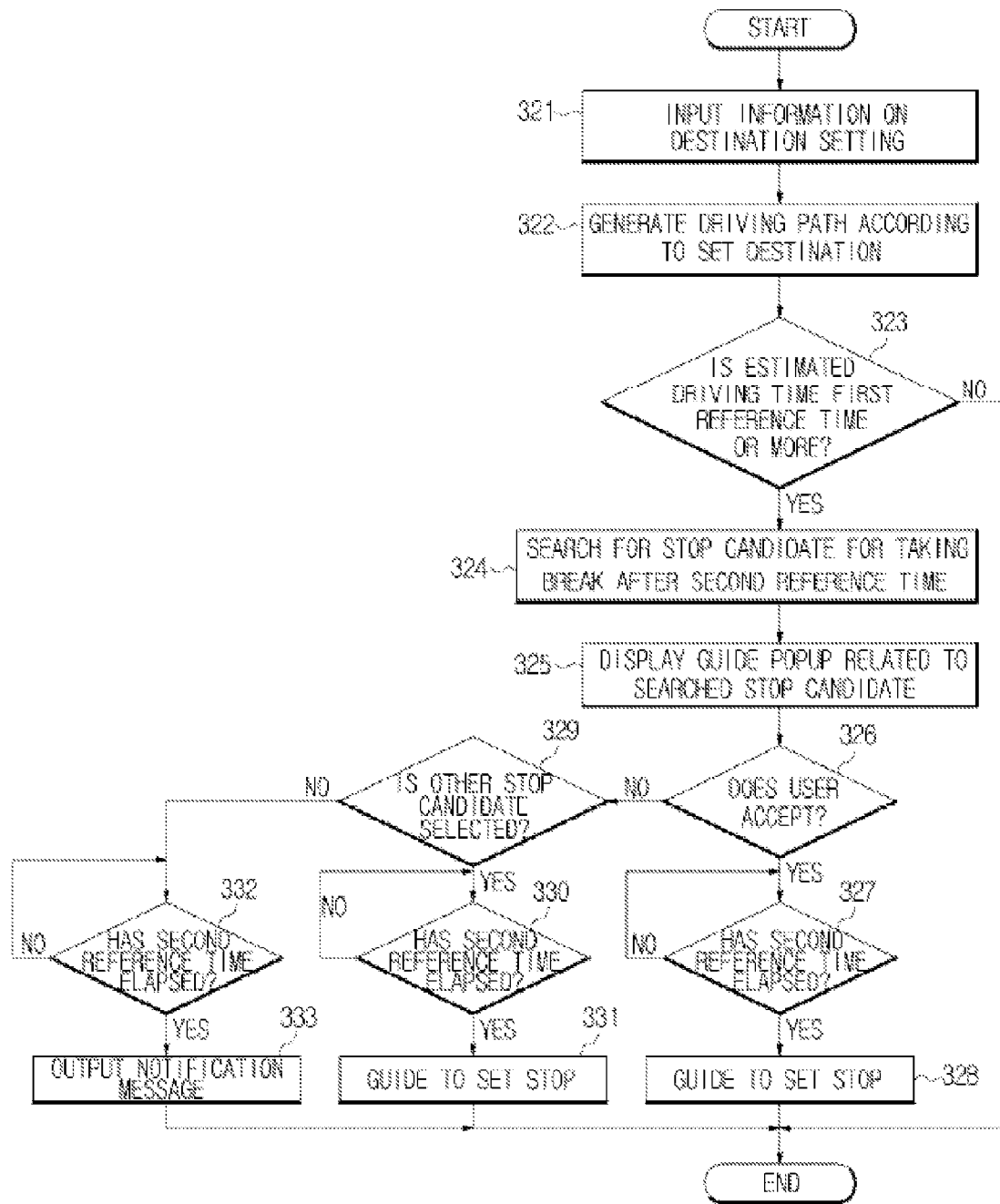
FIG. 18 is a flowchart illustrating a method of controlling a vehicle after user selection in the method of controlling a vehicle according to an embodiment of the present invention.

FIG. 18 is a flowchart illustrating a method of controlling a vehicle after user selection, in the method of controlling a vehicle according to an embodiment of the present invention.

As illustrated in FIG. 18, since inputting information on destination setting, at Step 321, to displaying the guide popup related to the searched stop candidate, at Step 325, are the same as in FIG. 17, description thereof will not be repeated.

The guide popup related to the searched stop candidate may include content for selecting to stop or not to stop at the searched stop candidate, or designating another stop, or may include content for selecting one of a plurality of stop candidates. In this example, the former case will be described.

When the user accepts (Yes at Step 326), that is, when the user selects the searched stop candidate as the stop, the searched stop candidate is set as the stop. When the second reference time elapses (Yes at Step 327), the vehicle is guided to the stop, at Step 328. When the user does not accept (No at Step 326), and selects another stop candidate as the stop (Yes at Step 329), another selected stop candidate is set as the stop. When the second reference time elapses, the vehicle is guided to the set stop, at Step 331.

When the vehicle 100 is guided, if the set stop is not located on the driving path generated according to the destination setting, a new driving path in which the set stop is passed to reach the destination may be generated and the vehicle 100 may be guided along the path. Therefore, when the stop is set, the driving path along which the vehicle 100 actually runs may be different from the driving path generated when the destination is set.

Meanwhile, when the driving path is newly generated due to deviation from the driving path of the vehicle 100 during driving, the driving path is newly generated by reflecting traffic information, or a location in which the vehicle 100 will be positioned after the second reference time elapses from the departure time is changed because traffic information differs from expectation at the time of destination setting, the stop candidate is searched for again, and the guide popup related thereto may be displayed again.

When the user does not select another stop (No at Step 329), if the second reference time elapses (Yes at Step 332), a notification message directly or indirectly indicating necessity of a break is output, at Step 333. The notification message may be output in the form of a guide popup, and the guide popup may be displayed on at least one of the cluster display 152, the HUD 153 and the AVN display 151. Description thereof is the same as in FIGS. 13 to 16.

According to the vehicle and the method of controlling the same, when the estimated driving time for the destination set by the user exceeds the predetermined time, the stop at which the user can take a break when the predetermined time elapses after driving starts is searched for and information on the stop is provided to the user so that the user can be prompted to take a break during long-term driving.

In the vehicle and the method of controlling the same according to the embodiments of the present invention, when an estimated driving time for a destination set by the user exceeds a predetermined time, a stop candidate at which the user can take a break when the predetermined time elapses after driving starts is searched for, and information on the stop is provided to the user so that the user may be prompted to take a break during long-term driving.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A vehicle, comprising:
an input unit configured to receive information on destination setting from a user;
a controller configured to generate a driving path from a departure position to the set destination and search for at least one stop candidate that is located on the driving path or a location adjacent to the driving path when an estimated driving time for the driving path is equal to or greater than a predetermined first reference time; and
a display unit configured to display a guide popup related to the at least one searched stop candidate,
wherein the controller searches for at least one first stop candidate based on a departure time and a predetermined second reference time when the estimated driving time is equal to or greater than a predetermined third reference time, and searches for at least one second stop candidate when the vehicle is turned off and turned on again after the predetermined second reference time elapses, or when the vehicle does not move for a predetermined time or more and moves again after the predetermined second reference time elapses.

2. The vehicle according to claim 1,
wherein the controller searches for the at least one stop candidate within a predetermined reference radius based on a location in which the vehicle will be positioned after the predetermined second reference time elapses from the departure time.

3. The vehicle according to claim 2,
wherein the controller searches for the at least one stop candidate by reflecting a destination setting history of the user or a preference stop of the user based on stop setting history.

4. The vehicle according to claim 2, further comprising:
a traffic information receiving unit configured to receive traffic information,
wherein the controller reflects the received traffic information, generates the driving path, and calculates the estimated driving time.

5. The vehicle according to claim 2,
wherein the guide popup includes a button for the user to select a stop location.

6. The vehicle according to claim 5,
wherein the button for selecting the stop location includes at least one of a button for selecting the searched stop candidate, a button for selecting not to stop, and a button for selecting another stop candidate instead of the searched stop candidate.

7. The vehicle according to claim 5,
wherein, when there is a plurality of searched stop candidates, the button for selecting the stop includes a button for selecting at least one of the plurality of searched stop candidates.

8. The vehicle according to claim 7,
wherein the controller sets a stop candidate selected by the user as the stop and guides the vehicle to pass the set stop.

9. The vehicle according to claim 8,
wherein, when a new driving path is generated while the vehicle drives, the controller searches for at least an additional stop candidate that is located on the new driving path or a location adjacent to the new driving path.

10. The vehicle according to claim 6,
wherein, when the user selects another stop candidate, the display unit displays a guide popup including a list of other stop candidates.

11. The vehicle according to claim 6,
wherein, when the user selects another stop candidate, the display unit displays a map of an area including a location in which the vehicle will be positioned after the predetermined second reference time elapses from the departure time, and a position of the another stop candidate on the map.

12. The vehicle according to claim 11,
wherein the input unit receives selection of the another stop candidate from the user.

13. The vehicle according to claim 5,
wherein, when the user selects not to stop, the display unit displays a guide popup for taking a break after the predetermined second reference time elapses from the departure time.

14. The vehicle according to claim 13,
wherein the guide popup includes a message indicating that the predetermined second reference time has elapsed from the departure time.

15. The vehicle according to claim 1,
wherein the display unit displays a timer indicating a driving time in a part of a path guide screen for guiding the driving path.

16. The vehicle according to claim 2,
wherein the stop candidate includes a location in which the user takes a break while driving.

17. A method of controlling a vehicle, comprising:
receiving information on destination setting from a user;
generating a driving path from a departure position to the set destination;
searching for at least one stop candidate that is located on the driving path or a location adjacent to the driving path when an estimated driving time for the driving path is equal to or greater than a predetermined first reference time; and
displaying a guide popup related to the at least one searched stop candidate,
wherein the searching for at least one stop candidate comprises:
searching for at least one first stop candidate based on a departure time and a predetermined second reference time when the estimated driving time is equal to or greater than a predetermined third reference time; and
searching for at least one second stop candidate when the vehicle is turned off and turned on again after the predetermined second reference time elapses, or when the vehicle does not move for a predetermined time or more and moves again after the predetermined second reference time elapses.

18. The method according to claim 17,
wherein the searching for the at least one stop candidate includes searching for the stop candidate within a predetermined reference radius based on a location in which the vehicle will be positioned after the predetermined second reference time elapses from the departure time.

19. The method according to claim 18,
wherein the searching for the at least one stop candidate includes searching for the stop candidate by reflecting a destination setting history of the user or a preference of the user based on stop setting history.

20. The method according to claim 17, further comprising:
searching for at least one stop candidate that is located on the new driving path or a location adjacent to the new driving path when a new driving path is generated while the vehicle drives.

* * * * *